(12) United States Patent
Kim

(10) Patent No.: US 9,477,688 B2
(45) Date of Patent: Oct. 25, 2016

(54) METHOD FOR SEARCHING FOR A PHONE NUMBER IN A WIRELESS TERMINAL

(75) Inventor: Bum-Soo Kim, Daegu (KR)

(73) Assignee: Samsung Electronics Co., Ltd (KR)

( * ) Notice: Subject to any disclaimer, the term of this patent is extended or adjusted under 35 U.S.C. 154(b) by 528 days.

(21) Appl. No.: 11/140,073

(22) Filed: May 31, 2005

(65) Prior Publication Data

US 2005/0265578 A1  Dec. 1, 2005

(30) Foreign Application Priority Data

Jun. 1, 2004  (KR) ........................ 10-2004-0039595

(51) Int. Cl.
*G06F 17/30* (2006.01)

(52) U.S. Cl.
CPC .............................. *G06F 17/30274* (2013.01)

(58) Field of Classification Search
USPC ......................................................... 382/305
See application file for complete search history.

(56) References Cited

U.S. PATENT DOCUMENTS

| | | | | | |
|---|---|---|---|---|---|
| 5,414,457 | A | * | 5/1995 | Kadowaki | H04M 1/27455 348/14.03 |
| 5,889,852 | A | * | 3/1999 | Rosecrans | H04M 1/27455 379/142.06 |
| 5,907,604 | A | * | 5/1999 | Hsu | H04M 1/576 348/14.01 |
| 5,983,176 | A | * | 11/1999 | Hoffert | G06F 17/30743 704/231 |
| 6,084,951 | A | * | 7/2000 | Smith | H04M 1/274516 379/93.17 |
| 6,161,021 | A | * | 12/2000 | Akpa | H04W 88/022 455/512 |
| 6,560,640 | B2 | * | 5/2003 | Smethers | H04L 29/06 709/219 |
| 6,647,130 | B2 | * | 11/2003 | Rhoads | G06F 17/30876 375/E7.026 |
| 6,766,018 | B1 | * | 7/2004 | Morita | H04M 1/27455 379/355.09 |
| 7,020,269 | B1 | * | 3/2006 | Park | H04M 1/27455 379/355.01 |
| 7,072,683 | B2 | * | 7/2006 | King | H04M 1/72544 455/419 |
| 2002/0054164 | A1 | * | 5/2002 | Uemura | G06F 3/04815 715/848 |
| 2003/0035100 | A1 | * | 2/2003 | Dimsdale | G06T 7/0018 356/124 |
| 2003/0100295 | A1 | * | 5/2003 | Sakai | H04M 1/576 455/415 |
| 2004/0102226 | A1 | | 5/2004 | Miwa | |

(Continued)

FOREIGN PATENT DOCUMENTS

| | | |
|---|---|---|
| CN | 1259004 A | 7/2000 |
| GB | 2346769 A | 8/2000 |

(Continued)

*Primary Examiner* — Tsung-Yin Tsai
(74) *Attorney, Agent, or Firm* — The Farrell Law Firm, P.C.

(57) ABSTRACT

In searching for a phone number in a wireless terminal, image search mode is entered when an image search is selected in phone book search mode and the image data stored in a phone book are displayed. When a SEND key is pressed continuously for a predetermined time, a call is sent to a phone number stored in the phone book associated with the selected image data. Whenever the SEND key is pressed for a predetermined time, phone numbers stored in the phone book associated with the selected image data are sequentially displayed. When image rearrangement is selected while image data are displayed, the image data are classified into moving and still images on a group-by-group basis and rearranged. When selected image view is selected while image data are displayed, the image data are enlarged and displayed, and image data stored in a corresponding folder are displayed.

5 Claims, 3 Drawing Sheets

(56) References Cited

U.S. PATENT DOCUMENTS

| | | | |
|---|---|---|---|
| 2004/0204202 A1* | 10/2004 | Shimamura | H04M 1/0235 455/575.1 |
| 2004/0263314 A1* | 12/2004 | Dorai | G06F 21/32 340/5.2 |
| 2005/0015370 A1* | 1/2005 | Stavely | G06F 17/30864 |
| 2005/0094852 A1* | 5/2005 | Kumar | H04N 19/61 382/107 |
| 2005/0128217 A1* | 6/2005 | Cohen | G06F 3/1431 345/603 |
| 2005/0250548 A1* | 11/2005 | White | G06F 17/30274 455/566 |
| 2006/0082518 A1* | 4/2006 | Ram | G06F 1/1601 345/1.1 |
| 2008/0148176 A1* | 6/2008 | Mita | G06F 3/04815 715/781 |

FOREIGN PATENT DOCUMENTS

| | | |
|---|---|---|
| KR | 2000-34283 | 6/2000 |
| KR | 2000-47524 | 7/2000 |

* cited by examiner

METHOD FOR SEARCHING FOR A PHONE NUMBER IN A WIRELESS TERMINAL

CROSS-REFERENCE TO RELATED APPLICATION

This application claims the benefit under 35 U.S.C. §119 (a) of Korean application entitled "Method for Searching for a Phone Number in a Wireless Terminal" filed in the Korean Intellectual Property Office on Jun. 1, 2004 and assigned Ser. No. 2004-39595, the entire contents of which are hereby incorporated by reference.

BACKGROUND OF THE INVENTION

1. Field of the Invention

The present invention relates generally to a method for searching for a phone number in a wireless terminal. More particularly, the present invention relates to a method for searching for a corresponding phone number using image data stored in a phone book.

2. Description of the Related Art

Currently, wireless terminals are being developed for a structure capable of transmitting high-speed data in addition to a voice communication function. That is, when a mobile communication system of the International Mobile Telecommunications-2000 (IMT-2000) standard is implemented, a high-speed data communication function as well as the voice communication function can be performed by using the wireless terminals. Data capable of being processed in the wireless terminal which performs the data communication function can be packet data or image data. Wireless terminals are equipped with a camera or television (TV) receiver for allowing the terminals to display a video signal. Thus, wireless terminals equipped with cameras can capture pictures to display moving and still images, and can transmit the images. When a phone book is registered which stores phone number information, and the like, still images also can be registered as user information.

When a phone number stored in the phone book is searched for, an existing method involves searching for a phone number using any of a number, name, voice, group and time. However, a need exists for a method for searching for a phone number using a still image which takes advantage of still images registered as user information.

SUMMARY OF THE INVENTION

Accordingly, an aspect of the present invention to provide a method for searching for a corresponding phone number using image data stored in a phone book.

The above and other aspects of the present invention can be achieved by a method for searching for a phone number in a wireless terminal. The method comprises the steps of entering image search mode when an image search is selected in phone book search mode, displaying all image data stored in a phone book in the image search mode, and displaying phone book information about selected image data when corresponding image data are selected from the entire image data.

The above and other aspects of the present invention can also be achieved by a method for searching for a phone number in a wireless terminal. The method comprises the steps of entering image search mode when an image search is selected in phone book search mode, displaying all image data stored in a phone book in the image search mode, displaying information about image data on which a cursor is placed, placing a call to a phone number stored in the phone book associated with image data on which the cursor is placed when a SEND key is pressed continuously for or greater than a predetermined time, sequentially displaying phone numbers stored in the phone book associated with image data on which the cursor is placed whenever the SEND key is pressed for a time less than the predetermined time, classifying the image data into moving and still images on a group-by-group basis and rearranging the image data when a image rearrangement is selected while the entire image data are displayed, enlarging and displaying image data on which the cursor is placed and displaying image data stored in a corresponding folder when selected image view is selected while the entire image data are displayed, and displaying phone book information about selected image data when corresponding image data are selected while the entire image data are displayed.

BRIEF DESCRIPTION OF THE DRAWINGS

The above and other aspects and advantages of the present invention will be more clearly understood from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Exemplary embodiments of the present invention will be described in greater detail herein below with reference to the accompanying drawings.

Throughout the exemplary embodiments of the present invention, the term 'image data' indicates moving or still images. In an exemplary embodiment of the present invention, a first display area displays image data stored in a phone book in the form of a thumbnail image in image search mode. A second display area displays information about image data displayed on the first display area. In an exemplary embodiment of the present invention, moving or still images can be selectively stored when the phone book is registered.

Figure 1:
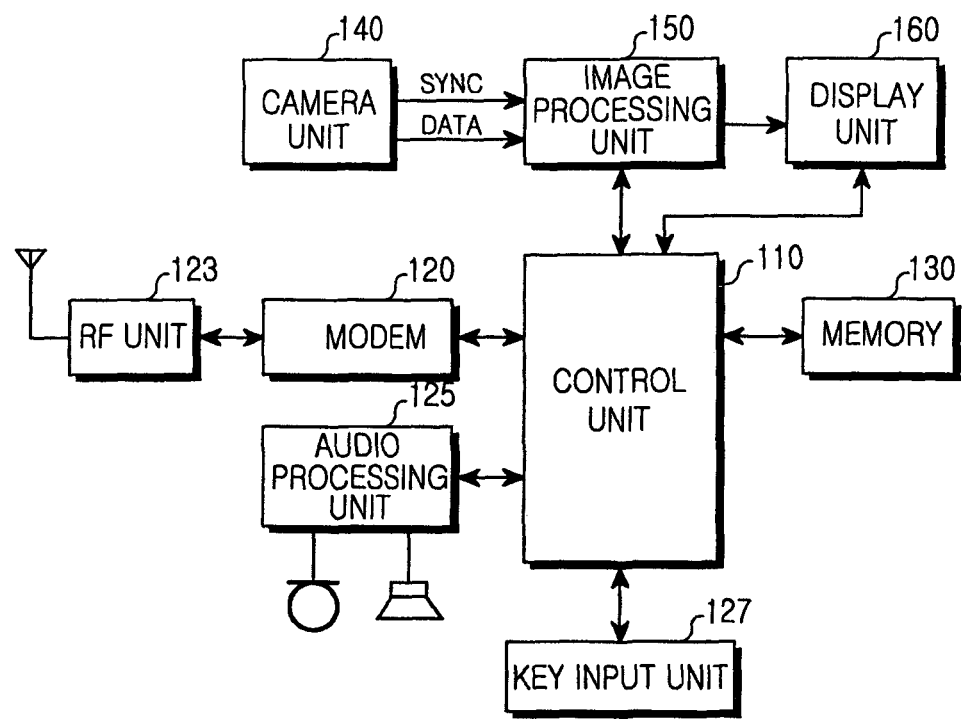
FIG. 1 is a block diagram illustrating a structure of a wireless terminal in accordance with an exemplary embodiment of the present invention.

FIG. 1 is a block diagram illustrating a structure of a wireless terminal in accordance with an exemplary embodiment of the present invention. Here, the wireless terminal is equipped with a camera.

Referring to FIG. 1, a radio frequency (RF) unit 123 performs a wireless communication function of the wireless terminal. The RF unit 123 comprises an RF transmitter (not illustrated) for up converting and amplifying a frequency of a signal to be transmitted, and an RF receiver (not illustrated) for low-noise amplifying a received signal and down converting a frequency of the received signal.

A modulator-demodulator (MODEM) 120 comprises a transmitter (not illustrated) for encoding and modulating a signal to be transmitted, a receiver (not illustrated) for demodulating and decoding a received signal, and so forth. An audio processing unit 125 can be configured by a coder-decoder (CODEC). The CODEC comprises a data CODEC for processing packet data, and the like and an audio CODEC for processing an audio signal such as voice, and the like. The audio processing unit 125 converts a digital audio signal received from the MODEM 120 into an analog audio signal through the audio CODEC to reproduce the analog audio signal, or converts an analog audio signal generated from a microphone into a digital audio signal through the audio CODEC to output the digital audio signal to the MODEM 120. The CODEC may be provided separately or in a control unit 110.

A memory 130 can comprise program and data memories, and the like. The program memory can store programs for controlling an operation for searching for information of a phone book through image data in accordance with an exemplary embodiment of the present invention. The data memory performs a function for temporarily storing data generated while the programs are executed. More specifically, the memory 130 can store the phone book in which the image data are stored in accordance with an exemplary embodiment of the present invention.

The control unit 110 controls overall operation of the wireless terminal in accordance with an exemplary embodiment of the present invention. Alternatively, the control unit 110 may comprise the MODEM 120 and the CODEC. More specifically, the control unit 110 controls an operation for searching for the phone book information through the image data stored in the phone book in accordance with an exemplary embodiment of the present invention.

A camera unit 140 captures image data, and comprises a camera sensor (not illustrated) for capturing image data and converting a captured optical signal into an electrical signal, and a signal processor (not illustrated) for converting an analog image signal captured by the camera sensor into digital data. Here, it is assumed that the camera sensor is a charge coupled device (CCD) sensor, and the signal processor can be implemented by a digital signal processor (DSP). The camera sensor and the signal processor can be integrated in a single body, or can be separate stand alone units.

An image processing unit 150 processes an image signal output from the camera unit 140 in frame units. The image processing unit 150 outputs the frame image data appropriate to the characteristics and size of a display unit 160. The image processing unit 150 comprises an image CODEC, and performs a function for compressing the frame image data displayed on the display unit 160 according to a preset compression scheme or for decoding the compressed frame image data into original frame image data. Here, the image CODEC can be a Joint Picture Experts Group (JPEG) CODEC, Moving Picture Experts Group 4 (MPEG-4) CODEC, Wavelet CODEC, and the like. It is assumed that the image processing unit 150 has an on-screen display (OSD) function, and the image processing unit 150 can output on-screen data based on the size of the image to be displayed according to a control operation of the control unit 110.

The display unit 160 displays an image signal output from the image processing unit 150, and displays user data and various display data output from the control unit 110. The display unit 160 can use a liquid crystal display (LCD). In case of the LCD, the display unit 160 can comprise an LCD controller, a memory capable of storing image data, an LCD element, and others. When the LCD is implemented using a touch-screen system, the LCD can serve as an input unit. More specifically, the display unit 160 can be divided into a first display area and a second display area in the image search mode for the phone book.

A key input unit 127 comprises keys for inputting number and letter information and function keys for setting various functions. More specifically, the key input unit 127 can comprise function keys for searching for image data of the phone book in accordance with an exemplary embodiment of the present invention.

Operation of the wireless terminal will be described with reference to FIG. 1. When a user sets signal transmission mode after a dialing operation through the key input unit 127, the control unit 110 detects the set signal transmission mode, controls the MODEM 120 to process received dial information, and controls the RF unit 123 to convert the processed information into an RF signal and output the RF signal. Subsequently, when an opposite subscriber generates a response signal, the control unit 110 detects the response signal through the RF unit 123 and the MODEM 120. The user performs a communication function by means of a voice communication path established through the audio processing unit 125. On the other hand, when signal reception mode is performed, the control unit 110 detects the signal reception mode through the MODEM 120 and controls the audio processing unit 125 to generate a ringtone. Subsequently, when the user makes a response, the control unit 110 detects the response. The user performs a communication function by means of a voice communication path established through the audio processing unit 125. Although an example of voice communication in the signal transmission and reception modes has been described above, a data communication function for communicating packet data and image data other than the voice communication can be performed. When a standby mode or character communication is entered or performed, the control unit 110 controls the display unit 160 to display character data processed by the MODEM 120.

Figure 2A:
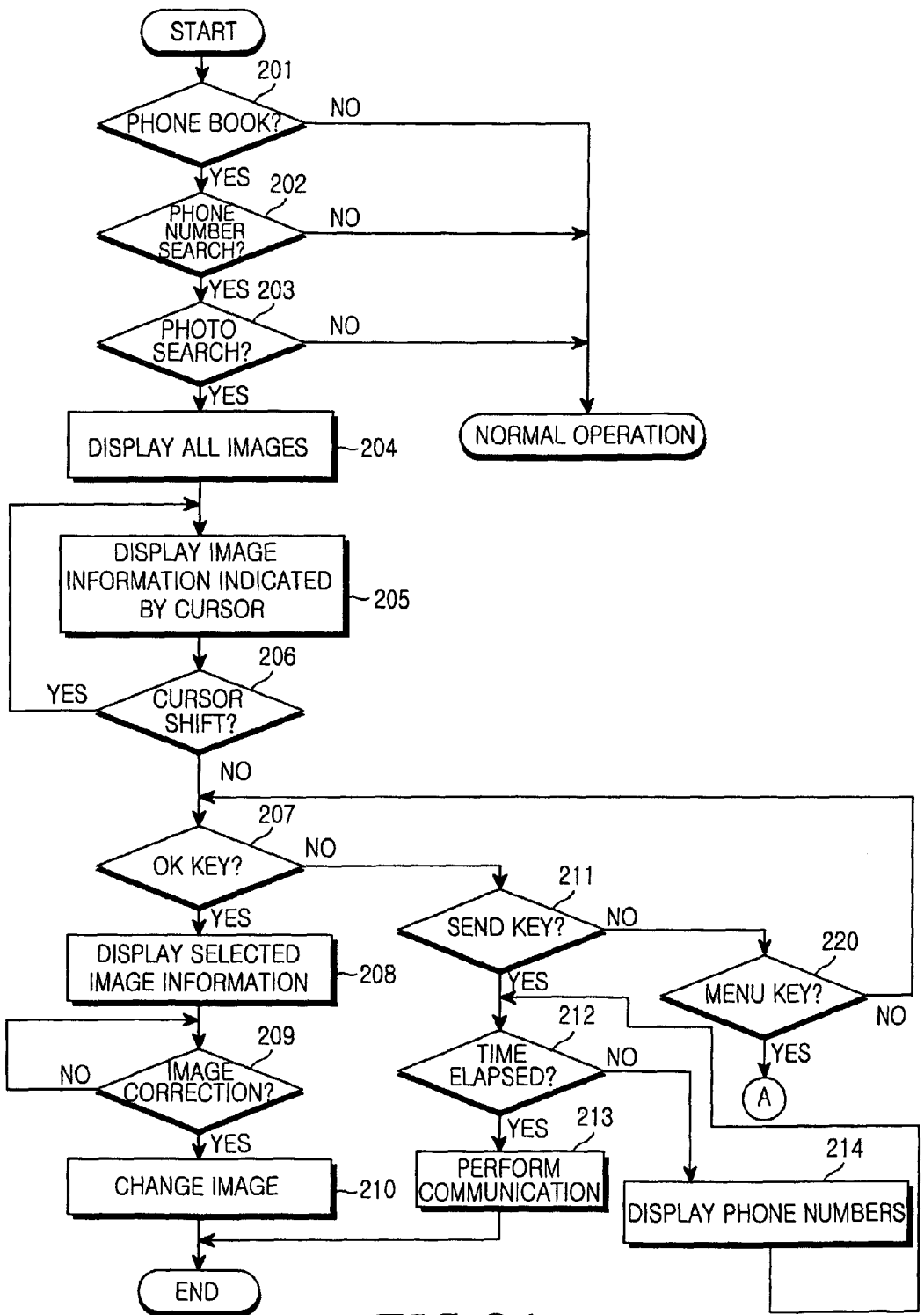
FIGS. 2A and 2B are flow charts illustrating a process for searching for a phone number using image data in a wireless terminal in accordance with an exemplary embodiment of the present invention.
Figure 2B:
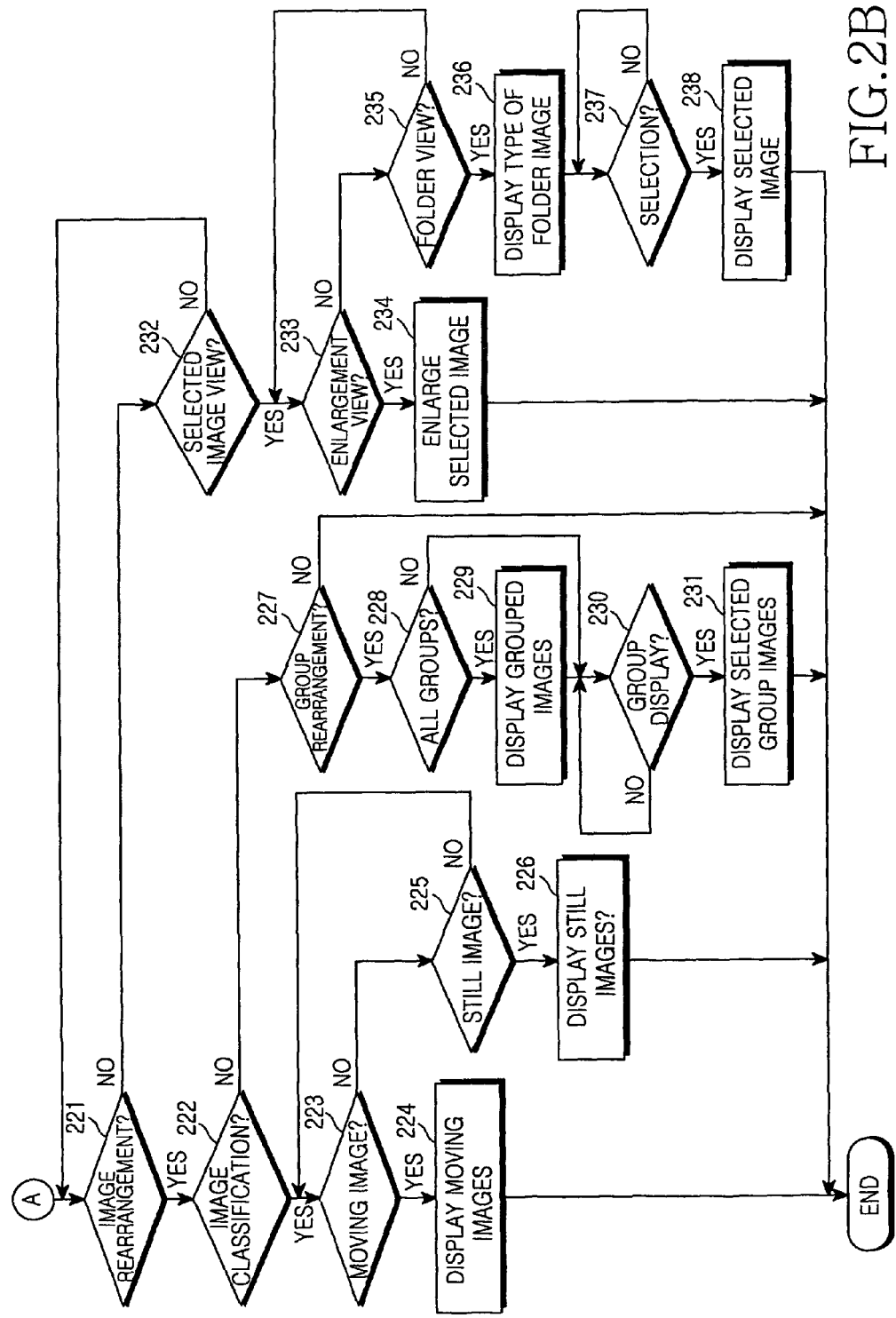

FIGS. 2A and 2B are flow charts illustrating a process for searching for a phone number using image data in a wireless terminal in accordance with an exemplary embodiment of the present invention.

The search process will be described in greater detail with reference to FIGS. 1, 2A and 2B.

Referring to FIG. 2A, when a phone book is selected in the wireless terminal, the control unit 110 detects the selection of the phone book, and displays function types of the phone book in step 201. When a phone number search is selected from the function types of the phone book, the control unit 110 detects the selection of the phone number search, and displays types of the phone number search in step 202. When a photo search is selected from the types of the phone number search, the control unit 110 detects the selection of the photo search in step 203, and controls the display unit 160 to display all or at least a selected subset of the image data stored in the phone book in step 204. In step 204, the display unit 160 is divided into a first display area and a second display area. The entire image data are displayed in the form of thumbnail images on the first display area. Marks for differentiating moving and still images can be displayed on the entire image data of the first display area. The process proceeds to step 205 to display information about image data on which a cursor is placed on the second display area. The image data information, indicated by the cursor, displayed on the second display area in step 205 can comprise a personal name, number, reception information, and image data type. The reception information indicates the number of messages transmitted to the wireless terminal, the number of received calls, and the like. When the number of messages is selected, the control unit 110 detects the selection of the number of messages and enters message check mode such that a user can identify information about a received message. When a received call is selected, the control unit 110 detects the selection of the received call and enters received call check mode such that the user can identify received call history information. The information displayed on the second display area can be changed and corrected by the user. When the user shifts the cursor by using direction keys of the key input unit 127, the control unit 110 detects the shifted cursor in step 206 and returns back to step 205. Through steps 204 and 205, the user can easily identify information about the displayed image data.

When the user inputs the OK key to select image data indicated by the cursor while the entire or a subset of the image data are displayed, the control unit 110 detects the input OK key in step 207, and proceeds to step 208 to display stored phone book information of a person using the selected image data. The phone information comprises personal names, phone numbers for home, mobile phone and office, image data, e-mail addresses, and the like. When the user selects the correction of image data, the control unit 110 detects the selection of the image data correction in step 209, and proceeds to step 210 to change the image data. When the user selects an image search in step 210, the control unit 110 detects the selection of the image search, and can select a type of image data stored in the memory 130 and can change and register the image data. Alternatively, the control unit 110 displays types of image data stored in a folder associated with a person, and can select, change, and register image data stored in the folder. Alternatively, when the user selects an image capture function in step 210, the control unit 110 detects the selection of the image capture function, and enters into an image capture mode. The user can select, change, and register image data captured in the image capture mode.

On the other hand, when the SEND key is input while the entire or at least a subset of the image data are displayed, the control unit 110 detects the input SEND key, and judges an input time of the SEND key in step 211. When the SEND key is pressed continuously for or greater than a predetermined time, the control unit 110 detects the SEND key pressed continuously for or greater than the predetermined time in step 212, and proceeds to step 213 to place a call to a phone number stored in a corresponding phone book associated with image data, indicated by the cursor, among the image data. The phone number used to place the call may be a phone number set as a basic value, or a phone number selected by the user. The second display area displays a phone number used to place a call. However, when the SEND key is pressed for a time less than the predetermined time, the control unit 110 detects the SEND key pressed for a time less than the predetermined time in step 212, and proceeds to step 214. In step 214, the control unit 110 controls the second display area to display number information for home, mobile phone and office stored in a corresponding phone book associated with image data indicated by the cursor. Whenever the SEND key is input for a time less than the predetermined time, the phone number information is sequentially displayed on the second display area. When the SEND key is pressed continuously for or greater than the predetermined time while the number information is sequentially displayed on the second display area, the control unit 120 detects the SEND key pressed continuously for or greater than the predetermined time, and proceeds to step 213 to place a call to a phone number displayed on the second display area.

When the MENU key is input while the entire or a subset of the image data are displayed, the control unit 110 detects the input MENU key, and controls the display unit 160 to display selection types of image data in step 220. Referring to FIG. 2B, when the image rearrangement is selected from the selection types of image data, the control unit 110 detects the selection of the image rearrangement, and displays types of the image rearrangement in step 221. When moving or still image classification or rearrangement is selected from the types of the image rearrangement, the control unit 110 detects the selection of the moving or still image classification or rearrangement, and displays types of the moving or still image classification or rearrangement in step 222. When the moving image classification or rearrangement is selected, the control unit 110 detects the selection of the moving image classification or rearrangement in step 223, and controls the first display area to display only moving images of all or a selected subset of the image data in the form of thumbnail images in step 224. In this case, the second display area displays information about a moving image on which the cursor is placed. Alternatively, when the still image classification or rearrangement is selected, the control unit 110 detects the selection of the still image classification/rearrangement in step 225, and controls the first display area to display only still images of the image data in the form of thumbnail images in step 226. In this case, the second display area displays information about a still image on which the cursor is placed. When group rearrangement is selected from the types of the image rearrangement, the control unit 110 detects the selection of the group rearrangement and displays types of the group rearrangement in step 227. When rearrangement for all groups, in other words, total group rearrangement, is selected from the types of the group rearrangement, the control unit 110 detects the selection of the total group rearrangement in step 228. The control unit 110 classifies and rearranges the displayed image data on a group-by-group basis, and controls the display unit 160 to display rearranged groups in the form of thumbnail images in step 229. In step 229, names of the rearranged groups are also displayed, and an arrangement method can be selected after a group is selected. When a corresponding group is selected from the rearranged groups, the control unit 110 detects the selected group in step 230, and controls the display unit 160 to display only image data of the selected group in the form of thumbnail images in step 231. Alternatively, when individual group rearrangement is selected from the types of the group rearrangement, the control unit 110 detects the selection of the individual group rearrangement in step 230, and controls the display unit 160 to display only image data of a selected group in the form of thumbnail images in step 231.

When selected image view is selected, the control unit 110 detects the selection of the image view and controls the display unit 160 to display types of the selected image view in step 232. When enlargement view is selected from the types of the image view, the control unit 110 detects the selection of the enlargement view in step 233, and then proceeds to step 234. In step 234, the control unit 110 enlarges only image data indicated by the cursor, and redisplays all or the selected subset of the image data. The image data on which the cursor is placed are enlarged and displayed in an image size larger than that of a thumbnail image displayed in step 204. Other image data are reduced and displayed in an image size smaller than that of the thumbnail image displayed in step 204. A thumbnail enlargement size of image data on which the cursor is placed, and a thumbnail reduction size of the other image data can be selectively set. Alternatively, when folder view is selected from the types of the selected image view, the control unit 110 detects the selection of the folder view in step 235 and proceeds to step 236. In step 236, the control unit 110 controls the display unit 160 to display types of image data stored in a folder of a person associated with information about image data on which the cursor is placed. When corresponding image data are selected from the folder, the control unit 110 detects the selected image data in step 237, and controls the display unit 160 to display the selected image data in step 238.

As it is apparent from the above description, the present invention provides a method for searching for a corresponding phone number using image data stored in a phone book, such that a user of a wireless terminal can easily search for a phone number.

Although exemplary embodiments of the present invention have been disclosed as an example, those skilled in the art will appreciate that various modifications, additions, and substitutions are possible, without departing from the scope of the present invention. Therefore, the present invention is not limited to the above-described exemplary embodiments, but is defined by the following claims, along with their full scope of equivalents.

What is claimed is:

1. A method for searching for a phone number in a wireless terminal, comprising:
    dividing a display screen of the wireless terminal into a first display area and a second display area if a phone book search mode is entered;
    displaying, on the first display area, a plurality of image data stored in a phone book;
    displaying, on the second display area, information corresponding to the plurality of image data displayed on the first display area, wherein the information corresponding to the plurality of image data is at least one of a name or a telephone number corresponding to each of the plurality of image data;
    displaying other information in response to selection of one of information displayed on the second display area, wherein the other information includes image data, a name, an email address, a home phone number, a mobile phone number, and a work phone number corresponding to the selected information; and
    displaying information about a selected image data in response to selection of one of the plurality of image data displayed on the first display area.

2. The method according to claim 1, further comprising:
    entering an image data correction mode if image data correction is selected while the other information is displayed;
    exchanging the displayed image data with image data selected from among a plurality of image data stored in the wireless terminal if a stored image search is selected in the image data correction mode; and
    exchanging the displayed image data with image data captured in an image capture mode if the image capture is selected in the image data correction mode.

3. The method according to claim 1, further comprising:
    selecting a correction mode while displaying the information corresponding to one of the plurality of image data.

4. A wireless terminal comprising:
    a display unit;
    a controller configured to:
    divide a display screen of the display unit into a first display area and a second display area if a phone book search mode is entered;
    display, on the first display area, a plurality of image data stored in a phone book;
    display, on the second display area, information corresponding to the plurality of image data displayed on the first display area, wherein the information corresponding to the plurality of image data is at least one of a name or a telephone number corresponding to each of the plurality of image data;
    display other information in response to selection of one of the information displayed on the second display area, wherein the other information includes image data, a name, an email address, a home phone number, a mobile phone number, and a work phone number corresponding to the selected information; and
    display information about a selected image data in response to selection of one of the plurality of image data on the first display area.

5. The wireless terminal according to claim 4, wherein the controller is further configured to:
    enter an image data correction mode if image data correction is selected while the information corresponding to the plurality of image data is displayed;
    exchange the displayed image data with image data selected from among a plurality of image data stored in the wireless terminal if a search is selected in the image data correction mode; and
    exchange the displayed image data with image data captured in an image capture mode if image capture is selected in the image data correction mode.

\* \* \* \* \*